United States Patent [19]

Moriguchi et al.

[11] Patent Number: 4,465,812

[45] Date of Patent: Aug. 14, 1984

[54] LINEAR MEDIUM- OR LOW-DENSITY POLYETHYLENE COMPOSITION

[75] Inventors: Kisoo Moriguchi; Isaburo Fukawa, both of Kurashiki, Japan

[73] Assignee: Asahi Kasei Kogyo Kabushiki Kaisha, Osaka, Japan

[21] Appl. No.: 427,202

[22] Filed: Sep. 29, 1982

[30] Foreign Application Priority Data

Oct. 23, 1981 [JP] Japan .............................. 56-168725

[51] Int. Cl.³ .............................................. C08F 8/00
[52] U.S. Cl. ................................... 525/333.8; 525/387
[58] Field of Search ....................................... 525/333.8

[56] References Cited

U.S. PATENT DOCUMENTS

| | | | |
|---|---|---|---|
| 3,012,020 | 12/1961 | Kirk, Jr. et al. | 525/333.8 |
| 3,079,370 | 2/1963 | Precopio et al. | 525/333.8 |
| 3,105,057 | 9/1963 | Medalia | 525/333.8 |
| 3,242,159 | 3/1966 | Kaufman | 525/333.8 |
| 3,887,534 | 6/1975 | Baba et al. | 525/333.8 |

Primary Examiner—Joseph L. Schofer
Assistant Examiner—Bernard Lipman
Attorney, Agent, or Firm—Sprung, Horn, Kramer & Woods

[57] ABSTRACT

A modified linear medium- or low-density polyethylene composition obtained by uniformly melt kneading a mixture of a linear medium- or low-density polyethylene having a density of not less than 0.90 g/cm³ but less than 0.94 g/cm³ and a melt index $(MI)_1$ of not more than 3 g/10 minutes and a radical initiator in an amount of not less than 0.0005% by weight but less than 0.1% by weight based on the weight of the linear medium- or low-density polyethylene at a temperature of from the melting point of the linear medium- or low-density polyethylene to a temperature of less than the thermal decomposition temperature of the linear medium- or low-density polyethylene to such an extent that the ratio of the melt index of the modified linear medium- or low-density polyethylene composition $(MI)_2$ to that of the linear medium- or low-density polyethylene $(MI)_1$ [$(MI)_2/(MI)_1$] is 0.05 to 0.9.

6 Claims, No Drawings

LINEAR MEDIUM- OR LOW-DENSITY POLYETHYLENE COMPOSITION

BACKGROUND OF THE INVENTION

The present invention relates to a modified medium- or low-density polyethylene composition.

The linear medium- or low-density polyethylene produced by the copolymerization of ethylene with other α-olefins exhibits excellent tensile strength, impact strength, rigidity, environmental stress cracking resistance (hereinafter referred to "ESCR") and thermal resistance as compared with the highly branched low-density polyethylene produced by the high pressure radical polymerization of ethylene. Accordingly, films or various molded articles obtained by injection molding, blow molding, extrusion molding or rotational molding of this linear medium- or low-density polyethylene exhibit properties, even at a thinner section thickness or at a lighter weight, comparable to those obtained from highly branched low-density polyethylene and, therefore, the linear medium- or low-density polyethylene is industrially valuable from the viewpoint of conserving raw materials and energy. Further, the linear medium- or low-density polyethylene has the above described excellent various properties, and accordingly can be employed under more severe conditions than a highly branched low-density polyethylene and can be made into articles having a high functionality.

Such a linear medium- or low-density polyethylene, however, has the following disadvantages compared with a highly branched low-density polyethylene. Namely, the transparency is inferior and accordingly, from the viewpoint of the external appearance of articles the commercial value is inferior. Also the melt tension and the melt elasticity are low and as a result, it is difficult to produce various molded articles by blow molding, extrusion molding and film molding and thus the molding conditions must be disadvantageously controlled in a narrow range. Moreover, in order to overcome these defects, the molding machines must be improved in a specific way and this is economically unfavorable.

SUMMARY OF THE INVENTION

Accordingly, an object of this invention is to eliminate the above described disadvantages in the prior art and to provide an improved polyethylene composition and a process for producing the same without impairing the excellent properties of linear medium- or low-density polyethylene and with eliminating their disadvantages.

Other objects and advantages of the present invention will be apparent from the description set forth hereinbelow.

In accordance with the present invention, there is provided a modified linear medium- or low-density polyethylene composition obtained by uniformly melt kneading a mixture of a linear medium- or low-density polyethylene having a density of not less than 0.90 g/cm$^3$ but less than 0.94 g/cm$^3$ and a melt index $(MI)_1$ of not more than 3 g/10 minutes and a radical initiator in an amount of not less than 0.0005% by weight but less than 0.1% by weight based on the weight of the linear medium- or low-density polyethylene at a temperature of from the melting point of the linear medium- or low-density polyethylene to a temperature of less than the thermal decomposition temperature of the linear medium- or low-density polyethylene to such an extent that the ratio of the melt index of the modified linear medium- or low-density polyethylene composition $(MI)_2$ to that of the linear medium- or low-density polyethylene $(MI)_1 [(MI)_2/(MI)_1]$ is 0.05 to 0.9.

According to this invention, there can be obtained polyethylene compositions having excellent properties of linear medium- or low-density polyethylenes such as high tensile strength, impact strength, rigidity, ESCR and thermal resistance and, in addition, improved properties such as high transparency, melt tension and melt elasticity which are highly valuable from the industrial viewpoint.

DESCRIPTION OF THE PREFERRED EMBODIMENTS

When polyethylene is melt kneaded together with a radical initiator, intermolecular bonding of polymers occurs and cross-linking reaction is caused and as a result, the melt viscoelastic behavior, the mechanical properties and the thermal properties of the polyethylene are modified. It is known that cross-linked polyethylene is utilized in various fields such as wire coating and foamed articles. The chemical cross-linking of polyethylene is a long-established technique (for example, U.S. Pat. No. 3,079,379 and British Pat. No. 1,001,343) and various improvements thereon are proposed [for example, Japanese Patent Publication (Kokoku) Nos. 39-18546/64 and 49-18101/74 and British Pat. Nos. 1,286,460 and 1,294,154]

However, according to these conventional techniques, basically polyethylene is highly cross-linked so as to swell in a solvent such as xylene (i.e., gelling occurs) and furthermore, these techniques neither disclose nor suggest that use of the specific linear medium- or low-density polyethylene before cross-linking in this invention exhibits remarkable effects.

In contrast to the above, the present invention is characterized in that a specified linear medium- or low-density polyethylene is employed and that the extent of cross-linking or intermolecular bonding is so small as not to swell in a solvent such as xylene (i.e., gelling does not occur). In this invention a small extent of cross-linking or intermolecular bonding is called as "modification" in order to distinguish from an ordinarily large extent of cross-linking or intermolecular bonding.

Furthermore, Japanese Patent Publication (Kokoku) No. 50-14672/75 proposes a method for obtaining polyethylene having a high die swell by treating a specific polyethylene together with a radical initiator at a temperature of not less than the melting temperature of the polyethylene in an extruder. According to this publication, however, it is not recognized from the technical viewpoint that the linear medium- or low-density polyethylene of this invention exhibits remarkable effects or various properties by modification as shown in this invention. In addition, the amount of a radical initiator employed is much greater than that of this invention and the resulting effects are different from those of this invention. U.S. Pat. No. 2,993,882 proposes a method for modifying the properties of polyethylene by reacting a specified polyethylene with a radical initiator. This method, however, relates to an ethylene-α-olefin copolymer where the content of the α-olefin is low, i.e., an ethylene-α-olefin copolymer having a high density, and is completely silent on an ethylene-α-olefin copolymer where the content of the α-olefin is high, i.e., an ethylene-α-olefin copolymer having a low density. In the Japanese Patent Publication (Kokoku) No. 50-14672/75 and U.S. Pat. No. 2,993,882 the amount of double bonds contained in the polyethylene is an important factor but in the present invention the amount of double bonds is not so important. More specifically, according to this invention due to a comparatively large amount of the α-olefin as the copolymerizable component the number of tertiary carbons is large and the tertiary carbons form radicals by the action of a radical initiator, resulting in the formation of intermolecular bonding and accordingly, it can be considered that the number of double bonds does not mean much in this invention.

The present invention will now be explained in more detail.

The linear medium- or low-density polyethylenes of this invention are copolymers of ethylene with at least one α-olefin such as propylene, butene-1, pentene-1, hexene-1, 4-methylpentene-1, octene-1 and decene-1 having a density of not less than 0.90 g/cm$^3$ but less than 0.94 g/cm$^3$ produced using a transition metal oxide catalyst such as a chromium oxide catalyst supported on silica or alumina or a coordinate catalyst comprising a halide of a transition metal of the 4th to 8th groups of the Periodic Table such as a titanium halide or a vanadium halide in combination with an organometal compound of the 1st to 3rd groups of the Periodic Table such as an organoaluminum-magnesium complex including an alkylaluminum-magnesium complex and an alkylalkoxyaluminum-magnesium complex and an organoaluminum compound including an alkylaluminum and an alkylaluminum chloride as the catalyst, except a radical initiator, by suspension polymerization, solution polymerization, gas phase polymerization or high pressure polymerization which is carried out at a pressure of 500 to 3,000 atms and a temperature of 150° C. to 300° C. Exemplary methods of producing the linear medium- or low-density polyethylenes which can be employed in this invention are described in U.S. Pat. Nos. 3,888,835 and 4,128,607 and French Pat. No. 2,292,717 for suspension polymerization, U.S. Pat. No. 4,076,698 and Canadian Pat. No. 842,351 for solution polymerization, U.S. Pat. No. 4,011,382 for gas phase polymerization and U.S. Pat. No. 1,161,737 and British Pat. Nos. 932,231 and 1,205,635. The amount of the α-olefin in the linear medium- or low-density polyethylene which can be employed in this invention ranges from 2.6% by weight to 25% by weight. A preferred density of the linear medium- or low-density polyethylene of this invention is 0.91 g/cm$^3$ to 0.935 g/cm$^3$. When the density is in this preferred range, utmost effects of the modification by a radical initiator according to this invention can be exhibited and various properties such as physical, chemical, mechanical, thermal and optical properties are improved to the maximum.

The radical initiators which can be employed in this invention include, for example, organic peroxides such as benzoyl peroxide, di-t-butyl peroxide, di-cumyl peroxide, 2,5-dimethyl-2,5-di(t-butylperoxy)hexane, 2,5-dimethyl-2,5-di(t-butylperoxy)hexyne, 1,3-bis(t-butylperoxyisopropyl)benzene, t-butyl hydroperoxide, cumene hydroperoxide, lauroyl peroxide, di-t-butyldiperoxy phthalate, t-butylperoxy maleic acid, and isopropyl percarbonate, azo compounds such as azobisisobutyronitrile and inorganic peroxy compounds such as ammonium persulfate. These compounds may be used alone or in any mixture thereof. Of these radical initiators, especially preferred are those having a decomposition temperature of 170° C. to 200° C. at a half-life of 1 minute such as di-t-butyl peroxide, dicumyl peroxide, 2,5-dimethyl-2,5-di(t-butylperoxy)hexane, 2,5-dimethyl-2,5-di(t-butylperoxy)hexyne and 1,3-bis(t-butylperoxyisopropyl)benzene.

The modification by a radical initiator can be carried out by, for example, adding the radical initiator to the linear medium- or low-density polyethylene and then thoroughly blending or mixing the mixture in a mixing apparatus such as a ribbon blender, a Henschel mixer or other similar mixers. The resultant mixture is then uniformly melt kneaded in, for example, a conventional extruder or kneader, thereby effecting the desired modification.

The extruders or kneaders which can be employed in the kneading according to the present invention may be single-screw type or double-screw type ones. Double-screw type extruders or kneaders are preferably employed for obtaining more uniform kneading and modification. For instance, CIM and DSM kneaders (manufactured by Japan Steel Works, Ltd.), a FCM kneader (manufactured by Farrel Corporation, U.S.A.), and conventional Banbury mixers are desirably used as the double-screw type kneader.

The melt kneading can be carried out at a temperature ranging from the melting temperature of the linear medium- or low-density polyethylene as the starting material to a temperature less than the thermal decomposition temperature of the polyethylene, preferably from 140° C. to 250° C. for about 1 to 5 minutes. It is preferred that the melt kneading is carried out at an atmosphere where the concentration of oxygen is as low as possible, for example, under nitrogen gas seal since at such an atmosphere a uniform polymer structure is formed or oxidation reaction does not occur.

In the practice of the present invention, control or adjustment of the degree of modification, i.e., a light degree of cross-linking is important. When the linear medium- or low-density polyethylene is kneaded in the presence of a radical initiator under the above described conditions, intermolecular bonding occurs and the melt index (hereinafter referred to "MI") of the polyethylene is lowered.

When the MI of the linear medium- or low-density polyethylene before modification is referred to as $(MI)_1$ and when the MI of the modified polyethylene obtained by melt kneading the polyethylene in the presence of a radical initiator is referred to as $(MI)_2$, it is preferred in this invention that $(MI)_1$ is not more than 3 g/10 minutes since with a $(MI)_1$ of higher than 3 g/10 minutes only products having low ESCR, impact strength and tensile strength are obtained and such products have low practical value. Further it is preferred to control or adjust the modification to such an extent that the ratio of $(MI)_2$ to $(MI)_1$ is 0.05 to 0.9. A ratio of $(MI)_2/(MI)_1$ of more than 0.9 does not result in the desired improvements on the practical properties. On the other hand, a ratio of $(MI)_2/(MI)_1$ of less than 0.05 results in undesirably high modification so that the resultant polyethylene composition is contaminated with gel polymers formed and the polymer structure becomes non-uniform and further the moldability is disadvantageously deteriorated for practical purposes.

The degree of modification can be controlled by appropriately selecting the kinds and the concentrations of the above described radical initiators and the methods and conditions of kneading, taking into account the characteristics of the linear medium- or low-density polyethylene before modification and additives. In this invention it is necessary that the concentration of the radical initiator is not less than 0.0005% by weight but less than 0.1% by weight based on the weight of the linear medium- or low-density polyethylene. Even when the ratio of $(MI)_2/(MI)_1$ is 0.05 to 0.9, if the amount of the radical initiator is not less than 0.1% by weight, gel substances are formed and the polyethylene composition produced becomes non-uniform or the moldability and the mechanical properties of the polyethylene composition obtained are deteriorated due to decomposed substances of the radical initiator. Furthermore, when the linear medium- or low-density polyethylene composition after modification is employed for preparing thin films having a thickness of not greater than 0.1 mm, in order to obtain excellent melt stretchability and to reduce fine fisheye it is preferred that the ratio of $(MI)_2/(MI)_1$ is more than 0.5 but not more than 0.9. In order to obtain such a degree of modification the amount of the radical initiator is typically less than 0.1% by weight. Especially desirable modified polyethylene compositions suitable for extrusion molding such as sheet or pipe extrusion and blow molding have a ratio of $(MI)_2/(MI)_1$ of 0.05 to 0.7. At this ratio of $(MI)_2/(MI)_1$ especially important characteristic features of the modified polyethylene composition, i.e., moldability and mechanical properties such as melt tension, die swell, impact strength and ESCR are balanced at a most desirable level.

The modified linear medium- or low-density polyethylene composition of the present invention can contain or be blended with various conventional additives such as stabilizers, anti-oxidants, ultraviolet absorbing agents, antistatic agents, pigments, inorganic or organic fillers and a small amount of rubber and other polymers in a conventional manner. However, it should be noted that the additives, e.g., conventional stabilizers and ultraviolet absorbing agents which may be directly reacted with the radical initiators can be added to the composition prior to the modification reaction but they are preferably added to the composition after completion of the modification reaction.

Exemplary additives which can be employed include BHT (i.e., 2,6-di-tert-butyl-p-cresol), IONOX 330 [i.e., 1,3,5-trimethyl-2,4,6-tris(3,5-di-tert-butyl-4-hydroxybenzyl)benzene] (manufactured by Shell Chemicals), GOOD-RITE 3114 [i.e., tris(3,5-di-tert-butyl-4-hydroxybenzyl)isocyanurate] (manufactured by Goodrich, B. F., Chemical Company), IRGANOX 1010 [i.e., tetrakis[methylene(3,5-di-tert-butyl-4-hydroxyhydrocinnamate)]methane], IRGANOX 1076 [i.e., octadecyl 3-(3',5'-di-tert-butyl-4'-hydroxyphenyl)propionate] and TINUVIN 327 [i.e., 2-(2'-hydroxy-3',5'-di-tert-butylphenol)-5-chlorobenzotriazole] (manufactured by Chiba Geigy Co.), SANOL LS 770 [i.e., bis(2,2,6,6-tetramethyl-4-piperidine)sebacate] (manufactured by Sankyo Co. Ltd.), DMTP (i.e., dimyristyl thiodipropionate), DLTDP (i.e., dilauryl thiodipropionate), calcium stearate, zinc stearate, titanium white, calcium carbonate, talc, styrene-butadiene rubber, and ethylene-vinyl acetate copolymer.

The present invention will now be illustrated by, but is by no means limited to, the Examples set forth below.

The physical properties used in the following Examples were determined as follows:

(i) MI: A melt index measured at a temperature of 190° C. under a load of 2.16 kg according to the ASTM D-1238 method.

(ii) MIR: A melt flow value measured under the same conditions as used in the determination of MI except that the load was changed to 21.6 kg was divided by MI. MIR is a criterion for flowability and with increased MIR, flowability in practical molding becomes better.

(iii) Density: Measured according to the ASTMD-1505 method.

(iv) Double bond: The number of double bonds was measured by infrared absorption analysis using a thin film prepared by compression molding. The trans-vinylene bond, the terminal vinyl bond and the vinylidene bond were obtained from absorptions at 964, 908 and 888 cm$^{-1}$, respectively and the number of double bonds was designated "the total number of the transvinylene bond, the terminal vinyl bond and the vinylidene bond".

(v) Amount of Comonomer: An amount of the comonomer contained in the polymer was measured by $C^{13}NMR$.

(vi) Melt Tension: A tension of a strand extruded from a rheo-meter at 190° C. and at a plunger speed of 2.0 cm/minute was measured at 10 m/minute.

(vii) Die Swell: Weight of parison having a length of 20 cm extruded at an output rate of 14 Kg/hour at 170° C. by using a blow molding die having an outer diameter of 16 mm and an inner diameter of 10 mm.

(viii) Tensile Impact Strength: Measured according to the ASTMD-1822 method.

(ix) ESCR (environmental stress cracking resistance): Measured according to the ASTMD-1693 except that the temperature employed was 80° C and the concentration of the nonionic surface active agent employed was 100%. ESCR is represented by the period of time until 50% of the number of test pieces is broken in the test.

(x) Haze: A compression-molded sheet having a thickness of 0.04 mm was measured according to the ASTM-1003 method.

(xi) Film-formability: A film was extruded at an extrusion temperature of 170° C. using a film-forming machine consisting of an extruder having a diameter of 30 mm, a T die having a die gap of 1.5 mm and a width of 150 mm and a roll cooler and then the take-up speed of the film was gradually increased and the film-formability and the amount of fisheye in the film were measured. When a film having a thickness of not higher than 20$\mu$ could be formed, the film-formability was judged as "good". When a film was broken at the thickness of 21 to 100$\mu$ the film-formability was judged as "ordinary". When only a film having a thickness of not less than 101$\mu$ was formed, the film-formability was judged as "poor".

The amount of fisheye was measured by counting the number of fisheyes having a diameter of at least 0.2 mm checked up by a spot gauge and converting the number of fisheyes into that per 100 g of the weight of the film. With the converted number of not more than 10, that of 11 to 100 and that of not less than 101, the amounts of fisheye were designated "small", "medium" and "large", respectively.

I. Preparation of Solid Catalysts (a) Solid Catalyst A

The oxygen and moisture present inside a 10 l autoclave were removed with dried nitrogen and to the autoclave was charged 4 l of n-hexane and cooled to −20° C. To the autoclave were added dropwise simultaneously 2 l of n-hexane containing 1.2 mols of $Al_{0.15}Mg(n-C_4H_9)_{2.45}$ and 2 l of n-hexane containing 1 mol of titanium tetrachloride and 1 mol of monobutoxyvanadyl chloride from the respective inlets of the autoclave at −20° C. over one hour with stirring and the reaction was continued further for 2 hours. The reaction mixture was filtered and the solid was washed with n-hexane. The resultant solid is referred to as "Solid Catalyst A".

(b) Solid Catalyst B

In a 10 l autoclave were charged 3.0 mols of a reaction product of $(C_2H_5)(n-C_4H_9)Mg$ and hydromethylpolysiloxane having a viscosity of 15 centistokes at a Si/Mg ratio of 1.0/1.0 and 3.0 mols of titanium tetrachloride together with 6 l of n-hexane and the mixture was reacted at −10° C. for 3 hours. Then the reaction mixture was treated in the same manner as in preparing Solid Catalyst A to give a solid catalyst which is referred to as "Solid Catalyst B".

(c) Solid Catalyst C

In a 10 l autoclave were charged 2.0 mols of $(sec-C_4H_9)(n-C_4H_9)Mg$, 1.5 mols of vanadyl trichloride and 1.5 mols of titanium tetrachloride together with 6 l of n-hexane and the mixture was reacted at −20° C. for 4 hours. Then the reaction mixture was treated in the same manner as in preparing Solid Catalyst A to give a solid catalyst which is referred to as "Solid Catalyst C".

(d) Solid Catalyst D

In a 10 l autoclave were charged 500 g of magnesium oxide and 5 l of titanium tetrachloride, and the mixture was reacted at 110° C. for 3 hours. The reaction mixture was filtered to separate a solid catalyst. The solid catalyst separated was washed with n-hexane and this solid catalyst is referred to "Solid Catalyst D".

II. Production of Polymers

Polymers were produced by continuous polymerization in a 200 l reactor. The solid catalyst, the organoaluminum compound, the α-olefin and hydrogen as set forth in Table 1 were fed into the reactor under the conditions as set forth in Table 1 while the temperature of the reactor was maintained at a temperature as set forth in Table 1, and the polymerization was carried out by charging ethylene, together with a solvent at a rate of 50 l/hour, into the reactor in such an amount as to produce a polymer at a rate of 6 to 10 Kg/hour. When the polymerization temperature was not higher than 100° C., isobutane was employed as the solvent and the polymerization pressure was 20 Kg/cm². On the other hand, when the polymerization temperature was not lower than 120° C., n-hexane was employed as the solvent and the polymerization pressure was 30 Kg/cm².

EXAMPLE 1

A. Production of Ethylene-α-Olefin Copolymer for Modification

A copolymer of ethylene and butene-1 was produced using the above described polymerization equipment and polymerization process, the catalyst and the polymerization conditions as set forth in Table 1. The concentration of butene-1 in the copolymer obtained was 7.6% by weight and the number of double bonds was 0.38 per 1,000 carbon atoms. This copolymer was modified by the following method and various properties were measured.

B. Production of Modified Polyethylene Composition 5 grams of a 10% by weight n-hexane solution of 2,5-dimethyl-2,5-di(tert-butylperoxy)hexane as the radical initiator was sprayed to 25 Kg of the pellets of the copolymer as obtained above and the resultant pellets were stirred in a Henschel mixer and then the n-hexane was evaporated by opening the cover of the Henschel mixer to give a mixture of the copolymer and the radical initiator. The concentration of the radical initiator was 20 ppm based on the amount of the copolymer.

The mixture was kneaded and extruded from a single-screw type extruder provided with a 60 mmφ screw at a temperature of 220° C. and at an extrusion rate of about 35 Kg/hour under nitrogen gas seal. The average retention time of the resin in the extruder was 2 minutes 40 seconds. To the modified ethylene-1-butene copolymer were added 500 ppm of BHT and 500 ppm of calcium stearate and the mixture was again extruded under the same conditions as employed above. Thus, the modified polyethylene composition containing the stabilizers was obtained.

EXAMPLE 2

Example 1 was repeated except that the amount of the radical initiator was changed to 100 ppm., i.e., 25 g of the 10% by weight n-hexane solution of the radical initiator based on 25 Kg of the pellets of the copolymer was used.

COMPARATIVE EXAMPLE 1

Example 1 was repeated except that the amount of the radical initiator was changed to 1500 ppm., i.e., 375 g of the 10% by weight n-hexane solution of the radical initiator based on 25 Kg of the pellets of the copolymer was used.

COMPARATIVE EXAMPLE 2

To the copolymer as obtained in Example 1 were added 500 ppm of BHT and 500 ppm of calcium stearate and the mixture was kneaded and extruded in the same manner as in Example 1 without modification by a radical initiator to give an unmodified polyethylene composition.

COMPARATIVE EXAMPLE 3

A high-density copolymer of ethylene-butene-1 was produced using the polymerization conditions as set forth in Table 1. The concentration of butene-1 in this copolymer was 0.8% by weight and the number of double bonds was 0.47 per 1,000 carbon atoms. Then to the copolymer was added the same stabilizers as in Example 1 and the mixture was kneaded and extruded in the same manner as in Example 1 to give an unmodified polyethylene composition containing the stabilizers.

COMPARATIVE EXAMLE 4

The copolymer as obtained in Comparative Example 3 was modified in the same manner as in Example 1 and then a modified polyethylene composition was prepared by adding the stabilizer thereto in the same manner as in Example 1 except that the amount of the radical initiator was adjusted so as to obtain almost the same MI of the modified polyethylene composition as that of Example 2, i.e., its amount being 90 ppm., more specifically, 22.5 g of the 10% by weight n-hexane solution of the radical initiator based on 25 Kg of the pellets of the copolymer was used.

COMPARATIVE EXAMPLE 5

The physical properties of a conventional high pressure process low-density polyethylene (product of Asahi-Dow Ltd., Japan, tradename "Asahi-Dow M1820") were measured.

COMPARATIVE EXAMPLE 6

The high pressure process low-density polyethylene as employed in Comparative Example 5 was modified in the same manner as in Example 1 except that the amount of the radical initiator was adjusted so as to obtain almost the same MI of the modified polyethylene composition as that of Example 2, i.e., its amount being 290 ppm., more specifically, 72.5 g of the 10% by weight n-hexane solution of the radical initiator based on 25 Kg of the polyethylene was used.

COMPARATIVE EXAMPLE 7

A copolymer of ethylene and butene-1 having almost the same MI, MIR and density as those of the modified polyethylene composition as obtained in Example 2 was produced using the polymerization conditions as set forth in Table 1 and then an unmodified polyethylene composition having the stabilizers was prepared in the same manner as in Comparative Example 2 using this copolymer.

The physical properties of the polyethylene compositions as obtained in Examples 1 and 2 and Comparative Examples 1 to 7 are shown in Table 2.

TABLE 1

| Example No. & Comparative Example No. | Solid Catalyst (Feed Amount g/hour) | Organoaluminum Compound (Feed Amount mmol/hour) | Polymerization Temperature (°C.) | α-Olefin (Feed Amount Kg/hour) | Hydrogen (Feed Amount l/hour) |
| --- | --- | --- | --- | --- | --- |
| Examples 1 & 2 & Comparative Examples 1 & 2 | A 0.21 | Al(i-$C_4H_9$)$_3$ 2.4 | 140 | butene-1 4.8 | 15 |
| Comparative Examples 3 & 4 | A 0.18 | Al($C_2H_5$)$_3$ 2.5 | 160 | butene-1 0.3 | 45 |
| Comparative Example 7 | D 1.2 | Al($C_2H_5$)$_3$ 6.1 | 130 | butene-1 4.0 | 11 |
| Examples 3 to 6 & Comparative Examples 8 to 10 | B 0.13 | Al(n-$C_8H_{17}$)$_3$ 4.7 | 80 | octene-1 2.2 | 70 |
| Comparative Examples 11 & 12 | B 0.10 | Al(i-$C_4H_9$)$_3$ 2.2 | 80 | octene-1 0.8 | 100 |
| Comparative Example 13 | C 0.14 | Al(n-$C_8H_{17}$)$_3$ 3.8 | 80 | octene-1 2.2 | 60 |
| Comparative Examples 14 & 15 | A 0.18 | Al($C_2H_5$)$_3$ 1.6 | 130 | hexene-1 6.3 | 12 |
| Comparative Examples 16 & 17 | A 0.20 | Al($C_2H_5$)$_3$ 1.8 | 160 | — | 18 |

TABLE 2

| | Example 1 | Example 2 | Comparative Example 1 | Comparative Example 2 | Comparative Example 3 | Comparative Example 4 | Comparative Example 5 | Comparative Example 6 | Comparative Example 7 |
| --- | --- | --- | --- | --- | --- | --- | --- | --- | --- |
| MI (g/minute) | 1.60 | 0.71 | 0.03 | 2.1 | 2.0 | 0.72 | 2.1 | 0.71 | 0.70 |
| MIR | 33 | 61 | 260 | 28 | 30 | 70 | 40 | 60 | 58 |
| Density (g/cm$^3$) | 0.925 | 0.924 | 0.923 | 0.925 | 0.955 | 0.955 | 0.919 | 0.919 | 0.924 |
| Melt Tension (g) | 1.8 | 3.2 | 8.5 | 1.3 | 3.7 | 5.4 | 12.8 | 15.1 | 2.0 |
| Die Swell (g) | 36.8 | 39.9 | 37.1 | 34.5 | 37.5 | 38.5 | 42.0 | 41.9 | 35.1 |
| Tensile Impact Strength (Kg.cm/cm$^2$) | 370 | 405 | 410 | 310 | 152 | 168 | 285 | 330 | 350 |
| ESCR (hour) | 450 | >500 | >500 | 300 | 1.5 | 1.5 | 0.5 | 0.5 | >500 |
| Haze (%) | 16.0 | 7.5 | 7.0 | 24.8 | 28.3 | 21.5 | 9.5 | 5.4 | 18.7 |
| Film-formability | good | ordinary | poor | good | good | good | good | ordinary | good |
| Amount of Fisheye | small | small | medium | small | small | small | small | large | small |
| Modification Conditions | | | | | | | | | |
| Polymer before Modification | Comparative Example 2 without Stabilizer | Comparative Example 2 without Stabilizer | Comparative Example 2 without Stabilizer | — | — | Comparative Example 3 without Stabilizer | — | Comparative Example 5 | — |
| Amount of Radical Initiator (weight %) | 0.002 | 0.01 | 0.15 | — | — | 0.009 | — | 0.029 | — |

EXAMPLE 3

A copolymer of ethylene and octene-1 was produced using the polymerization conditions as set forth in Table 1. The concentration of octene-1 in the copolymer obtained was 8.4% by weight and the number of double bonds was 0.09 per 1,000 carbon atoms. This copolymer was modified in the same manner as in Example 1 except that 12.5 g of a 10% by weight n-hexane solution of 2,5-dimethyl-2,5-di(tert-butylperoxy)hexyne as the radical initiator based on 25 Kg of the copolymer was employed, i.e., the amount of the radical initiator being 50 ppm instead of the 2,5-dimethyl-2,5-di(tertbutylperoxy)hexane and that the kneading and extrusion temperature was changed from 220° C. to 200° C. Then a modified polyethylene containing the stabilizers was obtained in the same manner as in Example 1.

EXAMPLE 4

A modified polyethylene composition having the stabilizers was prepared in the same manner as in Example 3 except that the amount of the radical initiator was changed from 50 ppm to 200 ppm., i.e., 50 g of the 10% by weight n-hexane solution of the radical initiator based on 25 Kg of the copolymer was used.

COMPARATIVE EXAMPLE 8

A modified polyethylene composition having the stabilizers was prepared in the same manner as in Example 3 except that the amount of the radical initiator was changed from 50 ppm to 1,200 ppm., i.e., 300 g of the 10% by weight n-hexane solution of the radical initiator based on 25 Kg of the copolymer was used.

COMPARATIVE EXAMPLE 9

An unmodified polyethylene composition having the stabilizers was prepared in the same manner as in Comparative Example 2 using the copolymer as obtained in Example 3.

EXAMPLE 5

The unmodified polyethylene composition having the stabilizers as obtained in Comparative Example 9 was modified in the same manner as in Example 3 except that the amount of the radical initiator was adjusted so as to obtain almost the same MI of the modified polyethylene composition as that of Example 3, i.e., its amount being 70 ppm, more specifically, 17.5 g of the 10% by weight n-hexane solution of the radical initiator based on 25 Kg of the copolymer was used.

EXAMPLE 6

The unmodified polyethylene composition having the stabilizers as obtained in Comparative Example 9 was modified in the same manner as in Example 3 except that the amount of the radical initiator was changed from 50 ppm to 650 ppm.

COMPARATIVE EXAMPLE 10

The unmodified polyethylene composition having the stabilizers as obtained in Comparative Example 9 was modified in the same manner as in Example 3 except that the amount of the radical initiator was changed from 50 ppm to 1,100 ppm., i.e., 162.5 g of the 10% by weight n-hexane solution of the radical initiator based on 25 Kg of the copolymer was used.

COMPARATIVE EXAMPLE 11

A high-density copolymer of ethylene-octene-1 was produced using the polymerization conditions as set forth in Table 1. The concentration of octene-1 in this copolymer was 2.3% by weight and the number of double bonds was 0.11 per 1,000 carbon atoms. Then an unmodified polyethylene composition containing the stabilizers was prepared in the same manner as in Comparative Example 2.

COMPARATIVE EXAMPLE 12

The copolymer as obtained in Comparative Example 11 was modified in the same manner as in Example 3 except that the amount of the radical initiator was adjusted so as to obtain almost the same MI of the modified polyethylene composition as that of Example 3, i.e., its amount being 55 ppm, more specifically, 13.75 g of the 10% by weight solution of the radical initiator based on 25 Kg of the copolymer was used. Then a modified polyethylene composition containing the stabilizers was obtained in the same manner as in Example 1.

COMPARATIVE EXAMPLE 13

A copolymer of ethylene-octene-1 having almost the same MI, MIR and density as those of the modified polyethylene composition of Example 3 was produced using the polymerization conditions as set forth in Table 1. Then a modified polyethylene composition containing the stabilizers was prepared in the same manner as in Example 1.

The physical properties of the polyethylene compositions as obtained in Examples 3 to 6 and Comparative Examples 8 to 13 are shown in Table 3.

TABLE 3

| | Example 3 | Example 4 | Comparative Example 8 | Comparative Example 9 | Example 5 | Example 6 | Comparative Example 10 | Comparative Example 11 | Comparative Example 12 | Comparative Example 13 |
|---|---|---|---|---|---|---|---|---|---|---|
| MI (g/minute) | 0.50 | 0.21 | 0.01 | 0.90 | 0.51 | 0.11 | 0.07 | 0.89 | 0.51 | 0.50 |
| MIR | 35 | 58 | 230 | 26 | 38 | 104 | 155 | 31 | 42 | 40 |
| Density (g/cm$^3$) | 0.932 | 0.931 | 0.930 | 0.932 | 0.932 | 0.931 | 0.930 | 0.949 | 0.949 | 0.933 |
| Melt Tension (g) | 3.9 | 5.2 | 13.2 | 2.2 | 4.2 | 7.6 | 9.0 | 4.6 | 6.0 | 2.9 |
| Die Swell (g) | 39.5 | 41.7 | 37.2 | 35.5 | 39.9 | 40.1 | 38.5 | 37.1 | 38.9 | 34.8 |
| Tensile Impact Strength (Kg.cm/cm$^2$) | 560 | 670 | 570 | 480 | 530 | 610 | 650 | 410 | 440 | 580 |
| ESCR (hour) | >500 | >500 | >500 | >500 | >500 | >500 | >500 | 10 | 11 | >500 |
| Haze (%) | 15.2 | 9.3 | 10.4 | 27.5 | 14.8 | 8.5 | 9.5 | 25.3 | 18.4 | 26.3 |
| Film-formability | good | ordinary | poor | good | good | ordinary | poor | good | ordinary | good |
| Amount of Fisheye | small | small | large | small | small | medium | medium | small | small | small |
| Modification Conditions | | | | | | | | | | |
| Polymer before Modification | Comparative Example 9 | Comparative Example 9 | Comparative Example 9 | — | Comparative Example 9 | Comparative Example 9 | Comparative Example 9 | — | Comparative Example 11 | — |

TABLE 3-continued

| | Example 3 | Example 4 | Comparative Example 8 | Comparative Example 9 | Example 5 | Example 6 | Comparative Example 10 | Comparative Example 11 | Comparative Example 12 | Comparative Example 13 |
|---|---|---|---|---|---|---|---|---|---|---|
| | without Stabilizer | without Stabilizer | without Stabilizer | — | with Stabilizer | with Stabilizer | with Stabilizer | — | without Stabilizer | — |
| Amount of Radical Initiator (weight %) | 0.005 | 0.02 | 0.12 | — | 0.007 | 0.065 | 0.11 | — | 0.0055 | — |

COMPARATIVE EXAMPLE 14

A copolymer of ethylene-hexane-1 was produced using the polymerization conditions as set forth in Table 1. The concentration of hexene-1 in the copolymer obtained was 14% by weight and the number of double bonds was 0.33 per 1,000 carbon atoms. This copolymer was modified in the same manner as in Example 1 except that the amount of the radical initiator was changed from 20 ppm to 200 ppm, i.e., 50 g of the 10% by weight n-hexane solution of the radical initiator based on 25 Kg of the copolymer was used, and then a modified polyethylene composition containing the stabilizers was prepared in the same manner as in Example 1.

COMPARATIVE EXAMPLE 15

An unmodified polyethylene composition having the stabilizers was prepared in the same manner as in Comparative Example 2 using the copolymer as obtained in Comparative Example 14.

COMPARATIVE EXAMPLE 16

A high-density polyethylene was produced using the polymerization conditions as set forth in Table 1. The number of double bonds was 0.48 per 1,000 carbon atoms. Then an unmodified polyethylene composition containing the stabilizers was prepared in the same manner as in Comparative Example 2.

COMPARATIVE EXAMPLE 17

The high-density polyethylene as obtained in Comparative Example 16 was modified in the same manner as in Example 1 except that the amount of the radical initiator was changed from 20 ppm to 200 ppm, i.e., 50 g of the 10% by weight n-hexane solution based on 25 Kg of the high-density polyethylene was used. Then a modified polyethylene composition containing the stabilizer was prepared in the same manner as in Example 1.

COMPARATIVE EXAMPLE 18

The physical properties of a conventional high pressure process low-density polyethylene (product of Asahi-Dow Ltd., Japan, tradename "Asahi-Dow L1850 A") were measured.

COMPARATIVE EXAMPLE 19

Example 1 was repeated except that the copolymer of ethylene and butene-1 was changed to the high pressure process low-density polyethylene of Comparative Example 18 and that the amount of the radical initiator was adjusted so as to obtain almost the same MI of the modified polyethylene composition as that of Comparative Example 14, i.e., its amount being 450 ppm, more specifically, 112.5 g of the 10% by weight n-hexane solution of the radical initiator based on 25 Kg of the high pressure process low-density polyethylene was used.

The physical properties of the polyethylene compositions as obtained in Comparative Examples 14 to 19 are shown in Table 4.

TABLE 4

| Comparative Example No. | 14 | 15 | 16 | 17 | 18 | 19 |
|---|---|---|---|---|---|---|
| MI (g/minute) | 1.27 | 6.5 | 6.4 | 1.31 | 6.6 | 1.30 |
| MIR | 48 | 25 | 27 | 59 | 33 | 56 |
| Density (g/cm$^3$) | 0.919 | 0.920 | 0.965 | 0.964 | 0.920 | 0.919 |
| Melt Tension (g) | 2.9 | 0.4 | 2.1 | 5.1 | 4.9 | 12.5 |
| Die Swell (g) | 39.3 | 32.1 | 34.8 | 37.7 | 39.9 | 41.6 |
| Tensile Impact Strength (Kg.cm/cm$^2$) | 260 | 180 | 115 | 135 | 210 | 281 |
| ESCR (hour) | 114 | 19 | 1 | 1 | 0.5 | 0.5 |
| Haze (%) | 8.1 | 17.8 | 35.6 | 23.5 | 6.3 | 5.1 |
| Film-formability | ordinary | good | good | ordinary | good | ordinary |
| Amount of Fisheye | small | small | small | small | small | small |
| Modification Conditions | | | | | | |
| Polymer before Modification | Comparative Example 15 without Stabilizer | — | — | Comparative Example 16 without Stabilizer | — | Comparative Example 18 |
| Amount of Radical Initiator (weight %) | 0.02 | — | — | 0.02 | — | 0.045 |

The following can be said from the physical properties of the polyethylene compositions as set forth in Tables 2 to 4.

(i) In comparing Examples 1 and 2 with Comparative Example 2, Examples 3 to 6 with Comparative Example 9 and Comparative Example 14 with Comparative Example 15, it can be observed that various properties of the modified polyethylene compositions such as the melt tension, the die swell, the tensile impact strength, the ESCR and the haze according to this invention have been much more improved than those of the unmodified polyethylene compositions.

(ii) It can be observed from Comparative Examples 1, 8 and 10 that even with an amount of the radical initiator of greater than 1,000 ppm the improvement on the die swell is smaller than that with an amount of the radical initiator of less than 1,000 ppm, and the moldability such as the film-formability and the formation of fisheye is rather deteriorated compared with that of the unmodified polyethylene compositions.

(iii) In comparing Example 2 with Comparative Example 7 and Example 3 with Comparative Example 13 it can be observed that the copolymers having the same MI, MIR and density as those of the modified polyethylene compositions according to this invention obtained only by polymerization are inferior in properties such as the melt tension, the die swell and the haze to the modified polyethylene compositions according to this invention.

(iv) As already stated in (i) in comparing Comparative Example 14 with Comparative Example 15, various properties are improved. The tensile impact strength and the ESCR of Comparative Example 14, however, are very low, compared with those of Examples 1 to 6 and accordingly are not sufficient for practical purposes. More specifically, products having practically high values can be obtained only when the MI before modification is not higher than 3 g/10 minutes.

(v) The improvements by the radical initiator according to this invention is especially remarkable with the medium- or low-density polyethylenes (the ethylene-α-olefin copolymer), compared with the high-density polyethylenes (Comparative Examples 3, 4, 11, 12, 16 and 17) and the high pressure process highly branched low-density polyethylenes (Comparative Examples 5, 6, 18 and 19). In order to show this effect, the related data is excerpted from Tables 2 to 4 and compiled in Table 5.

TABLE 5

| Kind of Polyethylene | MI Change Ratio* $(MI)_2/(MI)_1$ | Melt Tension Change Ratio* | Die Swell Change Ratio* | Tensile Impact Strength Change Ratio* | ESCR Change Ratio* | Haze Change Ratio* | Remarks |
|---|---|---|---|---|---|---|---|
| Modification of linear medium- or low-density polyethylene | 0.34 | 2.46 | 1.16 | 1.31 | >1.67 | 0.30 | Example 2 (after**) Comparative Example 2 (before***) |
| Modification of linear medium- or low-density polyethylene | 0.56 | 1.77 | 1.11 | 1.17 | — | 0.55 | Example 3 (after**) Comparative Example 9 (before***) |
| Modification of linear medium- or low-density polyethylene | 0.20 | 7.25 | 1.22 | 1.44 | 6.0 | 0.46 | Comparative Example 14 (after**) Comparative Example 15 (before***) |
| Modification of high density polyethylene | 0.36 | 1.46 | 1.03 | 1.11 | 1.0 | 0.76 | Comparative Example 4 (after**) Comparative Example 3 (before***) |
| Modification of high density polyethylene | 0.57 | 1.30 | 1.05 | 1.07 | 1.1 | 0.73 | Comparative Example 12 (after**) Comparative Example 11 (before***) |
| Modification of high-density polyethylene | 0.20 | 2.43 | 1.08 | 1.17 | 1.0 | 0.66 | Comparative Example 17 (after**) Comparative Example 16 (before***) |
| Modification of high pressure process low-density polyethylene | 0.34 | 1.18 | 1.00 | 1.16 | 1.0 | 0.57 | Comparative Example 6 (after**) Comparative Example 5 (before***) |
| Modification of high pressure process low-density polyethylene | 0.20 | 2.55 | 1.04 | 1.34 | 1.0 | 0.81 | Comparative Example 19 (after**) Comparative Example 18 (before***) |

*Change Ratio = $\frac{\text{Physical Value after Modification}}{\text{Physical Value before Modification}}$
**after: after modification
***before: before modification

What is claimed is:

1. A modified linear medium- or low-density ethylene copolymer composition obtained by uniformly melt kneading a mixture of a linear medium- or low-density copolymer of ethylene and 2.6 to 25% by weight of an α-olefin, having a density of not less than 0.90 g/cm³ but less than 0.94 g/cm³ and a melt index $(MI)_1$ of not more than 3 g/10 minutes, and at least one peroxide radical initiator in an amount of not less than 0.0005% by weight but less than 0.1% by weight based on the weight of the linear medium- or low-density copolymer in the substantial absence of oxygen at a temperature of from the melting point of the linear medium- or low-density copolymer to a temperature of less than the thermal decomposition temperature of the linear medium- or low-density copolymer for a time such that the ratio of the melt index of the modified linear medium-or low-density copolymer composition $(MI)_2$ to that of the linear medium- or low-density copolymer $(MI)_1$ $((MI)_2/(MI)_1)$ is 0.05 to 0.9.

2. The composition as claimed in claim 1, wherein $(MI)_2/(MI)_1$ is 0.05 to 0.7.

3. The composition as claimed in claim 1, wherein $(MI)_2/(MI)_1$ is more than 0.5 but not more an 0.9.

4. The composition as claimed in claim 1, wherein the density of the copolymer is 0.91 g/cm³ to 0.935 g/cm³.

5. The composition as claimed in claim 1, wherein the radical initiator is di-tert-butylperoxide, dicumylperoxide, 2,5-dimethyl-2,5-di(tert-butylperoxy)hexane, 2,5-dimethyl-2,5-di(tert-butylperoxy)hexyne or 1,3-bis(tert-butylperoxyisopropyl)benzene.

6. The composition as claimed in claim 1, wherein the α-olefin is propylene, butene-1, pentene-1, hexene-1, 4-methylpentene-1, octene-1 or decene-1.

* * * * *